(12) United States Patent
Shiogama

(10) Patent No.: US 7,477,737 B2
(45) Date of Patent: Jan. 13, 2009

(54) ELECTRONIC APPARATUS, AND COVER AND STRUCTURAL BODY THEREOF

(75) Inventor: Naoki Shiogama, Shizuoka (JP)

(73) Assignee: NEC Corporation, Tokyo (JP)

( * ) Notice: Subject to any disclaimer, the term of this patent is extended or adjusted under 35 U.S.C. 154(b) by 97 days.

(21) Appl. No.: 11/224,113

(22) Filed: Sep. 13, 2005

(65) Prior Publication Data

US 2006/0056617 A1    Mar. 16, 2006

(30) Foreign Application Priority Data

Sep. 15, 2004   (JP)   ............... 2004-268370

(51) Int. Cl.
*H04M 1/00*    (2006.01)
*H04M 9/00*    (2006.01)
(52) U.S. Cl. .................. 379/447; 379/433.11
(58) Field of Classification Search ............ 379/433.08, 379/440, 433.11, 447, 450; 455/550.1, 556.1, 455/572–574, 575.8
See application file for complete search history.

(56) References Cited

U.S. PATENT DOCUMENTS

| | | | |
|---|---|---|---|
| 5,509,057 A | | 4/1996 | Anello et al. |
| 5,768,370 A | * | 6/1998 | Maatta et al. .......... 379/433.01 |
| 5,793,619 A | * | 8/1998 | Deguchi .................... 361/814 |
| 6,201,867 B1 | | 3/2001 | Koike |
| 6,563,927 B2 | * | 5/2003 | Mote et al. ............. 379/433.11 |
| 7,149,559 B2 | * | 12/2006 | Qin et al. .................. 455/575.8 |
| 7,299,077 B2 | | 11/2007 | Pan |
| 2001/0007823 A1 | * | 7/2001 | Lee ............................. 455/573 |
| 2002/0085709 A1 | * | 7/2002 | Hsu ...................... 379/433.11 |
| 2004/0180706 A1 | | 9/2004 | Pan |

FOREIGN PATENT DOCUMENTS

| | | |
|---|---|---|
| CN | 570438 Y | 1/2004 |
| EP | 1 349 354 A1 | 10/2003 |
| EP | 1 441 490 A1 | 7/2004 |
| JP | 58-166078 | 11/1983 |
| JP | 09-263208 | 10/1997 |
| JP | 2771518 | 4/1998 |
| JP | 10-322426 | 12/1998 |
| JP | 3063050 | 8/1999 |

(Continued)

*Primary Examiner*—Curtis Kuntz
*Assistant Examiner*—Phylesha Dabney
(74) *Attorney, Agent, or Firm*—Foley & Lardner LLP

(57) ABSTRACT

An electronic apparatus with a detachable cover is proved. The present invention is possible to maintain a satisfactory outward appearance when the cover is attached to the apparatus, and to improve the structural body of the apparatus in terms of strength and formability without having to diminish the inner space for built-in mounting components. According to the present invention, an electronic apparatus having a cover which is attached to an outside of a structural body and at least a peripheral edge portion of which is bent inwards, is characterized in that the cover has a plurality of ribs each of which has a first portion protruding from a predetermined region including a part of a crease on an inner side and crossing the crease as seen from the inner side of the cover, and a second portion crossing the first portion, with the first portion and the second portion being integrated with each other, and the structural body has a plurality of holes being fit-engaged with the ribs at positions corresponding to the plurality of ribs.

6 Claims, 9 Drawing Sheets

FOREIGN PATENT DOCUMENTS

| | | |
|---|---|---|
| JP | 2002-125022 A | 4/2002 |
| JP | 2003-032342 A | 1/2003 |
| JP | 2004-111777 A | 4/2004 |
| TW | 570 438 | 7/2004 |
| WO | WO 2004/008722 A1 | 1/2004 |
| WO | WO 2004/008724 A1 | 1/2004 |

* cited by examiner

ELECTRONIC APPARATUS, AND COVER AND STRUCTURAL BODY THEREOF

BACKGROUND OF THE INVENTION

1. Field of the Invention

The present invention relates to an electronic apparatus having a detachable cover on an outside of a structural body of the electronic apparatus, such as a case or a frame, and to a cover and structural body thereof. In particular, the present invention relates to an electronic apparatus having a construction in which a cover attached thereto can be brought into a tight contact with the structural body, thereby being capable of maintaining a satisfactory outward appearance, and to the cover and structural body thereof.

2. Description of the Related Art

In some electronic apparatus such as a mobile phone, an elaborately designed cover is further attached to an outside of a structural body (case) for a variation in artistic design, thus providing a sense of fun like changing of clothes.

For example, Registered Utility Model Application No. 3063050 discloses a "Mobile Communication Apparatus with an Easily Replaceable Decorative Apparatus," in which the main body of a mobile communication apparatus itself is sandwiched between a front cover and a rear cover that are provided with various designs, configurations, colors, etc., thus providing a mobile communication apparatus that can be varied in outward appearance. In this mobile communication apparatus, locking members respectively provided on the front cover and the back cover sandwiching the main body are connected with each other to firmly secure the whole together. Further, JP 2003-32342 A discloses a mobile information apparatus that easily allows a change in outward appearance by means of an external decorative cover. In this mobile information apparatus, a protrusion provided on a battery cover to be attached from behind to a main portion of the apparatus main body through sliding is engaged with a groove of an engagement mechanism provided on an external decorative cover covering the main portion of the apparatus main body, thereby securing the whole together.

Apart from these, there exists a construction in which a base case and a fixing portion for attaching a cover to the base case are predetermined, and solely the cover, which is selected from separately prepared covers of different designs and colors, is replaced to easily realize a variation in design and color.

FIG. 7A is a perspective view of an example of the outward construction of a mobile phone. FIG. 7B is a side view of an upper case 100, which is shown in FIG. 7A. As shown in FIG. 7B, in the upper case 100, a main body case is formed by a first case 101 and a second case 103, and requisite electronic components, etc. for the upper case are contained in this main body case. Further, a detachable cover 102 can be attached to the first case 101.

FIG. 8 is a perspective view of a conventional example 1 of the construction of the first case 101 and cover 102.

In the cover of this construction, a part of the peripheral edge portion thereof is generally inwardly bent (or curved), and when attached, it is necessary for the cover to be integrated with the case constituting the base so as to maintain a well-harmonized outward appearance. However, this cover, which is formed as a thin-walled molding, is subject to generation of curvature or gap in the peripheral edge portion. Thus, when, as shown in FIG. 8, the cover 102 is attached to the outside of the first case 101, a level difference (gap) is generated, as shown in the sectional view of FIG. 9, between the peripheral edge portion of the cover 102 and the first case 101 due to curvature at the time of molding of the cover 102. Thus, when the first case 101 and the second case 103 are combined to form the main body case, there is generated a step due to the curvature of the cover 102 in the peripheral edge portion of the second case 103, resulting in a problem in terms of outward appearance.

As means for solving this problem, there is a construction in which, as shown in FIG. 10 as the conventional example 2, there are provided in the inner corner portion of the cover 102 a plurality of vertical ribs 102a perpendicular to the crease direction, preventing (rectifying) curvature of the cover 102 itself by means of the vertical ribs 102a and achieving an increase in bending strength. Further, in the first case 101, there is formed a large clearance 101a in correspondence with these vertical ribs 102a. However, in the construction shown in FIG. 10, it is impossible to completely suppress the molding curvature of the cover 102. Further, it is necessary to form the large clearance 101a in the first case 101, resulting in a problem in terms of the strength and formability of the first case 101.

As another means, there exists a construction in which, as shown in FIG. 11 as the conventional example 3, there is arranged in the inner corner portion of the cover 102 a lateral rib 102b formed so as to extend continuously along the crease direction, whereas a groove 101b is formed at the position of the first case 101 corresponding to the lateral rib 102b; by fitting the lateral rib 102b of the cover 102 into the groove 101b of the first case 101, the opening of the peripheral edge portion of the cover 102 is suppressed. In this construction, however, due to the formation of the groove 101b in the first case 101, the thickness of the case peripheral portion toward the interior increases, which leads to a problem from the viewpoint of securing the space for the built-in mounting components.

SUMMARY OF THE INVENTION

In view of the above-mentioned problems inherent in the prior art, it is an object of the present invention to provide an electronic apparatus, and a cover and structural body of the electronic apparatus. In the electronic apparatus having a structure capable of replacing only the cover of the body case, it is possible to maintain a satisfactory outward appearance when the cover is attached thereto, and to improve the structural body in terms of strength and formability without having to diminish the space for built-in mounting components.

According to a first aspect of the present invention, an electronic apparatus having a cover which is attached to an outside of a structural body and at least a peripheral edge portion of which is partially or entirely bent inwards, wherein the electronic apparatus comprises a plurality of ribs provided on the cover and a plurality of holes provided on the structural body. Each of the plurality of ribs has a first portion protruding from a predetermined region including a part of a crease on an inner side and crossing the crease as seen from the inner side of the cover, and a second portion crossing the first portion, with the first portion and the second portion being integrated with each other. Each hole provided on the structure is fit-engaged with the rib at a position corresponding to each of the plurality of ribs.

The electronic apparatus according to the present invention is preferable that each rib has a T-shaped, L-shaped, or Ω-shaped configuration as seen from the inner side of the cover.

The electronic apparatus according to the present invention is preferable that the first portion of each rib is joined to a surface portion of the cover on an end portion side with respect to the crease.

The electronic apparatus according to the present invention is preferable that the second portion of each rib is joined to a surface portion of the cover on an inboard side with respect to the crease.

The electronic apparatus according to the present invention is preferable that each rib has a claw portion, and that the structural body has an engagement portion to be engaged with the claw portion at a position corresponding to each claw portion.

According to a second aspect of the present invention, a cover which is attached to an outside of a structural body and at least a peripheral edge portion of which is partially or entirely bent inwards, is characterized in that the cover has a plurality of ribs each of which has a first portion protruding from a predetermined region including a part of a crease on an inner side and crossing the crease as seen from the inner side of the cover, and a second portion crossing and integrated with the first portion, and each rib is fit-engaged with a predetermined portion of the structural body.

According to a third aspect of the present invention, a structural body to an outside of which a cover at least a peripheral edge portion of which is partially or entirely bent inwards is attached, is characterized in that the structural body has a plurality of holes which are provided in a predetermined region including an outer corner portion and each of which has a first portion crossing a ridge of a crease of the corner portion as seen from an outside of the structural body and a second portion crossing and integrated with the first portion, and each hole is fit-engaged with a predetermined portion of the cover.

According to the present invention, when the structural body and the cover are joined together, the second portion of the rib arranged on the cover is fit-engaged with the hole arranged in the structural body, with the result that the rib becomes outwardly immovable, thereby making it possible to prevent the cover from opening outwardly through the first portion of the rib. Thus, even when there is curvature in the cover prior to its attaching to the structural body, it is rectified after the attaching in conformity with the configuration of the structural body. Further, since the peripheral edge portion of the cover does not expand outwardly, it is possible to form satisfactory mating surfaces not involving generation of a step or a gap between the cover end portion and the structural body, thereby realizing a satisfactory outward appearance.

DESCRIPTION OF THE EXEMPLARY EMBODIMENTS

Embodiment 1

Figure 1:
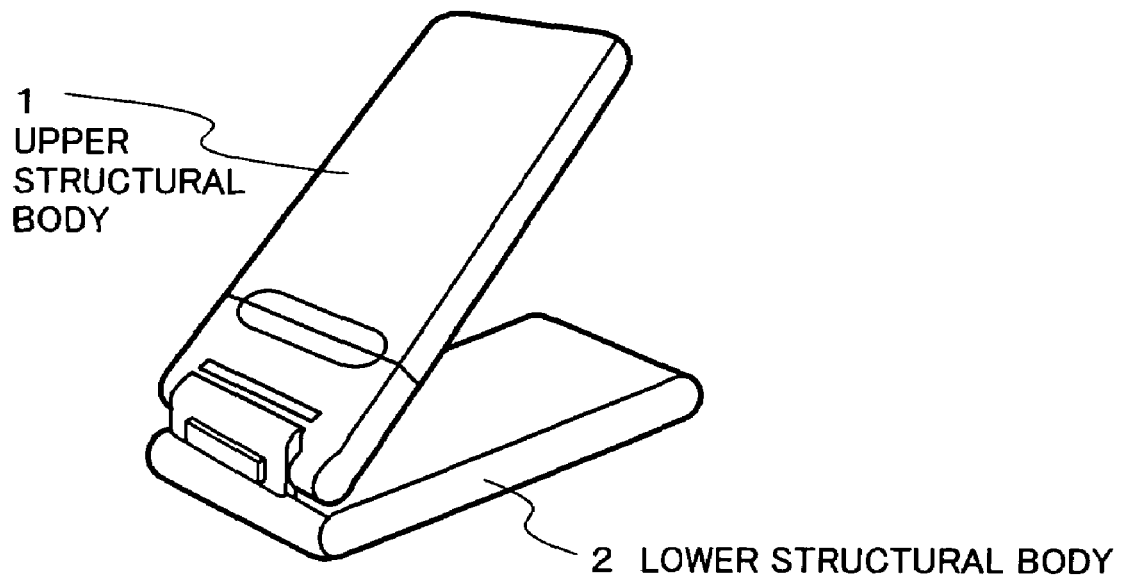
FIG. 1A is a schematic outward view showing an example of the construction of an electronic apparatus to which the present invention is applied.
FIG. 1B is a schematic side view showing the construction of an upper structural body in FIG. 1A.
Figure 1:
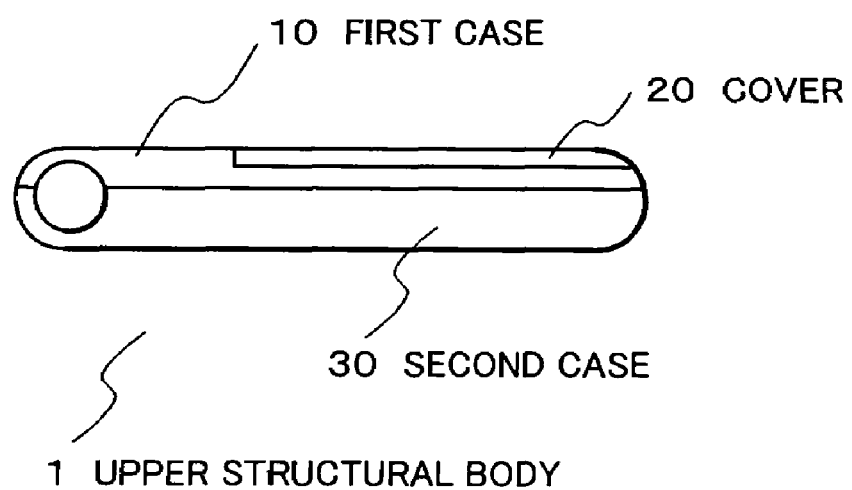
Figure 2:
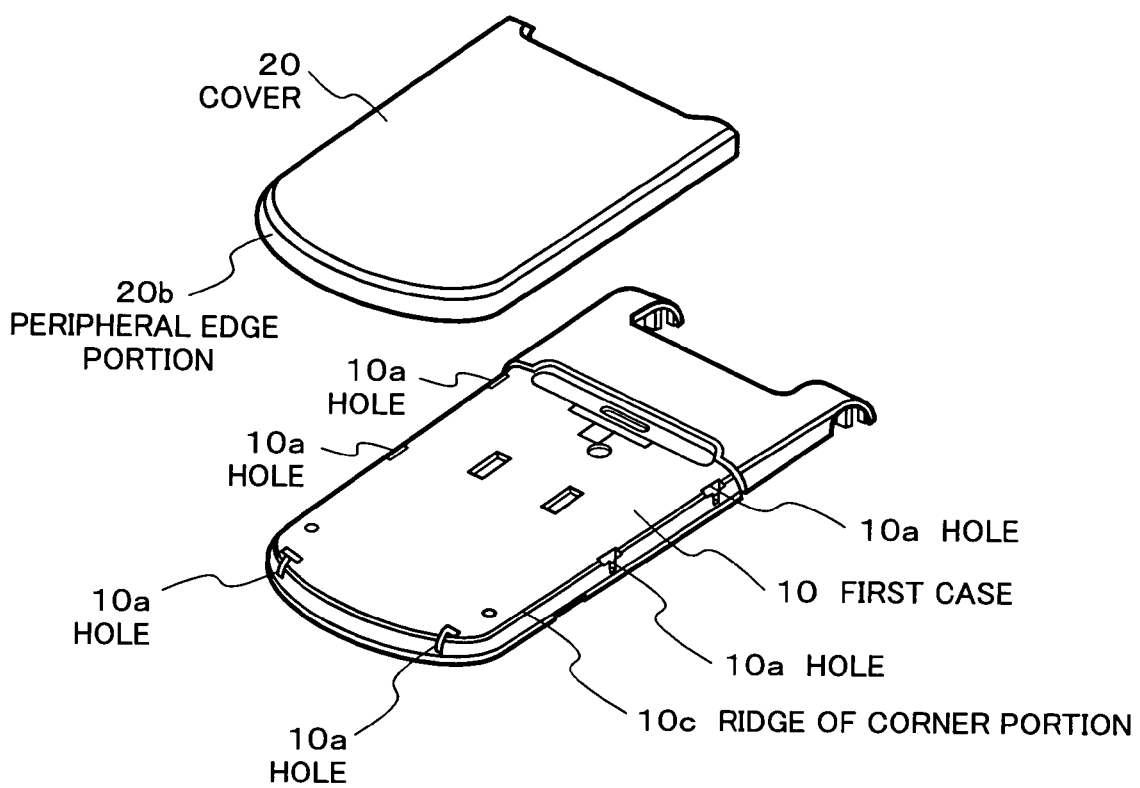
FIG. 2 is an exploded perspective view schematically showing the construction of a cover and a case of an electronic apparatus according to Embodiment 1 of the present invention.
Figure 3:
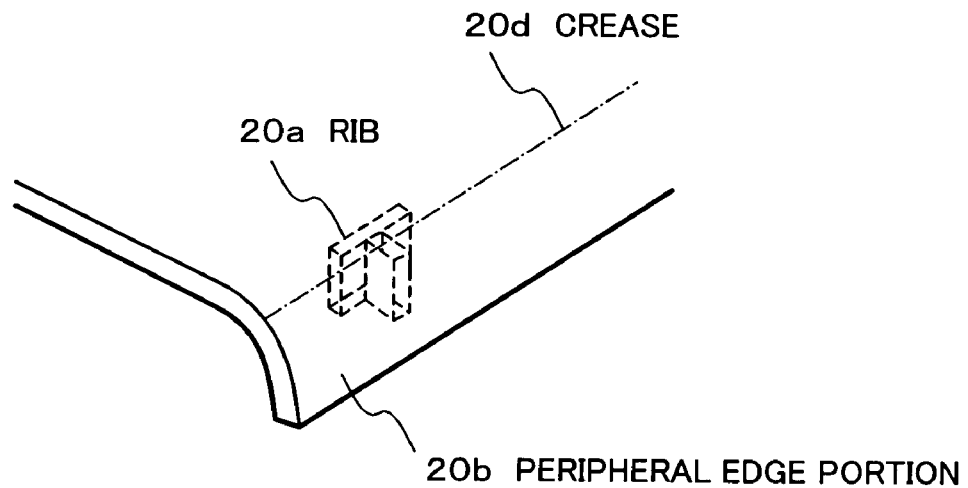
FIG. 3 is a partial perspective view schematically showing the construction of the cover of the electronic apparatus according to Embodiment 1 of the present invention.
Figure 4:
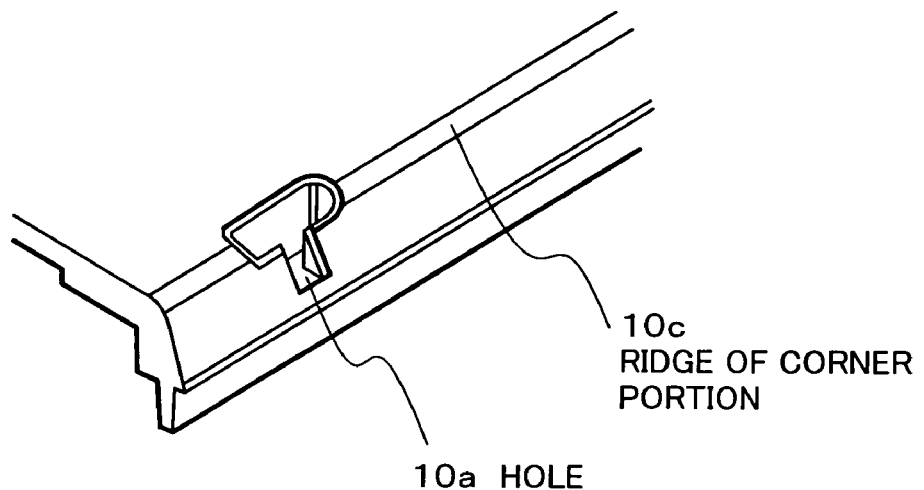
FIG. 4 is a partial perspective view schematically showing the construction of the case of the electronic apparatus according to Embodiment 1 of the present invention.
Figure 5:
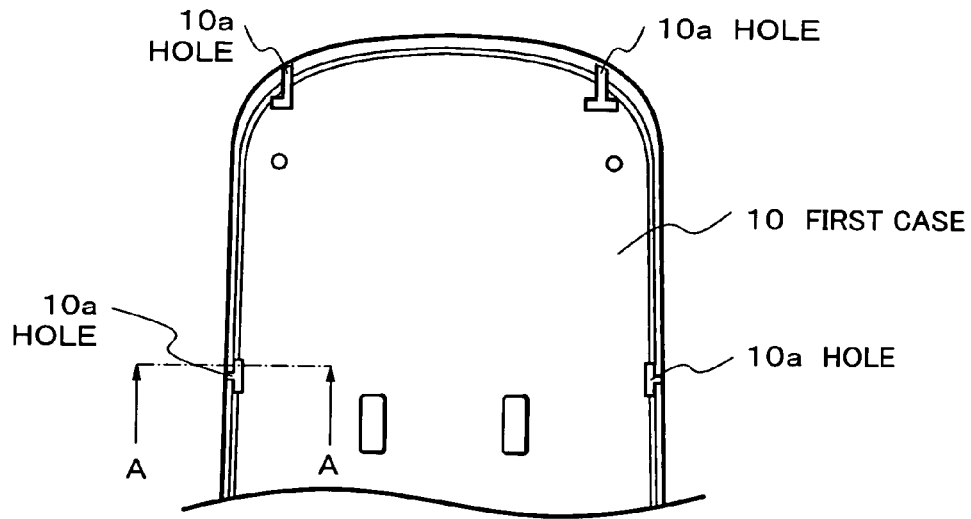
FIG. 5A is a partial top view schematically showing holes of the case of the electronic apparatus according to Embodiment 1 of the present invention.
FIG. 5B is a partial sectional view, taken along the line A-A of FIG. 5A, of the case of the electronic apparatus according to Embodiment 1 of the present invention with the cover attached thereto.
FIG. 5C is a partial sectional view taken along the line B-B of FIG. 5B.
Figure 5:
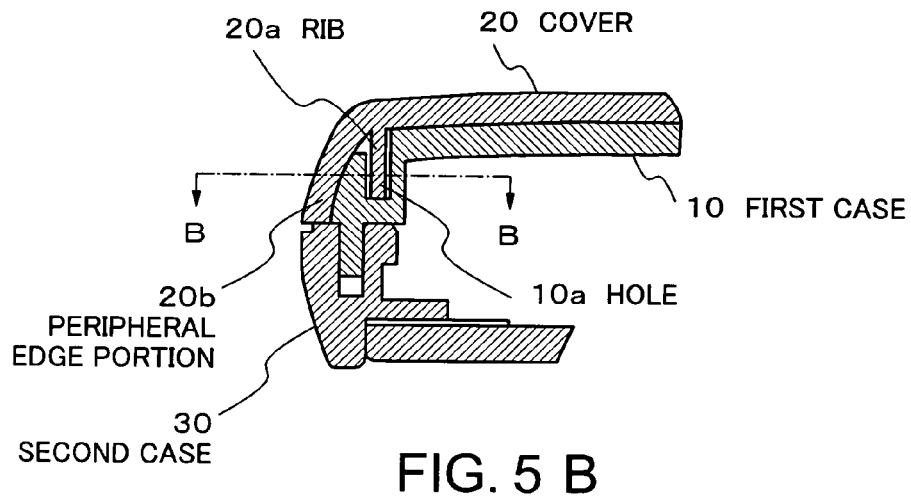
Figure 5:
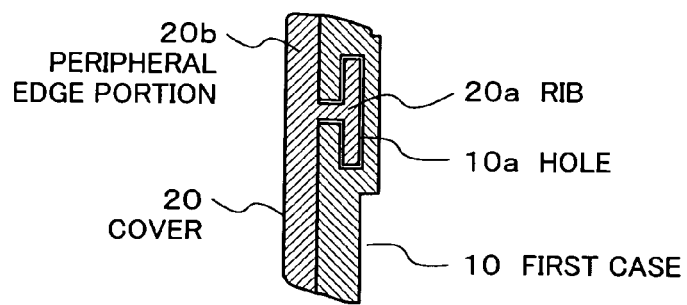

Embodiment 1 of the present invention will be described with reference to the drawings. FIG. 1A is a schematic outward view showing an example of the construction of an electronic apparatus to which the present invention is applied. FIG. 1B is a schematic side view showing the construction of an upper structural body in FIG. 1A. FIG. 2 is an exploded perspective view schematically showing the construction of a cover and a case of an electronic apparatus according to Embodiment 1 of the present invention. FIG. 3 is a partial perspective view schematically showing the construction of the cover of the electronic apparatus according to Embodiment 1 of the present invention. FIG. 4 is a partial perspective view schematically showing the construction of the case of the electronic apparatus according to Embodiment 1 of the present invention. FIG. 5A is a partial top view schematically showing holes of the case of the electronic apparatus according to Embodiment 1 of the present invention. FIG. 5B is a partial sectional view, taken along the line A-A of FIG. 5A, of the case of the electronic apparatus according to Embodiment 1 of the present invention with the cover attached thereto. FIG. 5C is a partial sectional view taken along the line B-B of FIG. 5B.

Examples of the electronic apparatus include a mobile phone, an electric appliance, and an office automation machine that are equipped with a casing having a construction in which a thin-walled cover is fit-engaged with a structural body (a case, frame or the like). As the material of such a structural body allowing molding, it is possible to use, for example, a resin material such as acrylic butadiene styrene (ABS) or polycarbonate (PC). Further, as the cover or the structural body, it is also possible to adopt a metal thin-walled cover, which can be used as an external decorative structural body for a large cabinet or structural body. Embodiment 1 will be described as applied to a mobile phone.

FIGS. 1A and 1B are perspective views showing an example of the construction of a mobile phone to which the present invention is applied. FIG. 1A is an overall outward view, and FIG. 1B is a side view of an upper structural body 1 in FIG. 1A. As shown in FIG. 1B, the upper structural body 1 constitutes a main body case formed by a first case 10 and a second case 30, and this main body case mounts therein various electronic component parts required for the upper structural body. Further, a detachable cover 20 can be attached to the first case 10 from outside the first case 10. FIG. 2 is a perspective view showing an example of the construction of the first case 10 and cover 20.

As shown in FIG. 2, the first case 10 has a plurality of holes 10a, and each hole is provided as a part of fixing structure for attaching the cover 20. In correspondence with the holes 10a of the first case 10, a plurality of ribs 20a are provided on the back side of a peripheral edge portion 20b of the cover 20. In FIG. 2, the ribs 20a are situated on the lower surface of the cover 20 facing the first case 10, so the ribs 20a are not shown in the drawing.

FIG. 3 is a schematic diagram showing an example of one of ribs 20a provided on the cover 20, and FIG. 4 is a schematic diagram showing an example of one of holes 10a to be fit-engaged with the rib 20a to thereby firmly attach the cover 20 to the first case 10. FIG. 5A is a partial top view schematically showing examples of various kinds of holes 10a in the first case 10. FIG. 5B is a partial sectional view, taken along the line A-A of FIG. 5A, of a portion where a rib 20a of the cover 20 is fit-engaged with a hole 10a of the first case 10, with the cover 20 attached to the first case 10. FIG. 5C is a partial sectional view taken along the line B-B of FIG. 5B.

First, with reference to FIG. 3, the construction of the cover 20, provided with the ribs 20a, will be described.

The cover 20 is attached to the outer surface of the first case 10. The peripheral edge portion 20b of the cover 20 is continuously bent (or curved) toward the inner side of the cover 20 in a region extending along the side end portion of the first case 10. The cover 20 has a plurality of ribs 20a at predetermined positions on the inner side. Each rib 20a protrudes from a predetermined region including a crease 20d on the inner side, and has first and second portions that are formed into, for example, a T-shaped integral unit, of which the first portion has a linear component crossing the crease 20d as seen from the inner side of the cover 20 (e.g., the vertical portion of the T-shaped unit), and the second portion has a linear component crossing the first portion (e.g., the horizontal portion of the T-shaped unit). In Embodiment 1, the integral unit is formed in a T-shaped configuration as seen from the inner side of the cover 20.

Next, with reference to FIG. 4, the construction of the first case 10 provided with the holes 10a will be described.

The first case 10 has a plurality of holes 10a for attaching the cover 20 from the outside. Each hole 10a is a bottomed hole to be fit-engaged with the corresponding rib 20a of the cover 20. Each hole 10a is provided in a predetermined region including an outer corner portion of the first case 10, and has first and second portions formed into an integral unit, of which the first portion has a linear component crossing the ridge 10c of the corner portion as seen from the outside of the first case, and the second portion has a linear component crossing the first portion. In Embodiment 1, each hole 10a is formed in a T-shaped configuration as seen from the outside of the first case 10.

Apart from the T-shaped configuration as seen from the outside of the first case 10, the hole 10a may also adopt an L-shaped or an Ω-shaped configuration. In this case, there may be a (small) gap between the rib 20a and the hole 10a as long as the rib 20a can be constrained within the hole 10a of the first case 10. For example, when the rib 20a has an Ω-shaped configuration, and the hole 10a has a rhombic configuration, the rib 20a may be constrained by linear contact at four positions between the outer round surface of the Ω-shaped rib and the inner surfaces of the rhombic hole.

FIGS. 5B and 5C are sectional views showing how a rib 20a of the cover 20 is fit-engaged with a hole 10a of the first case 10. FIG. 5B is a schematic sectional view, taken along the line A-A of FIG. 5A, of the portion where one of the ribs 20a of the cover 20 is fit-engaged with the corresponding hole 10a of the first case 10, with the cover 20 attached to the first case 10. The line A-A of FIG. 5A is off the first portion of the rib 20a, cutting solely the second portion thereof. Thus, FIG. 5B is a side view showing how the second portion of the rib 20a enters the hole 10a of the first case 10. FIG. 5C is a sectional view taken along line B-B of FIG. 5B, showing from above how the first and second portions of the rib 20a formed integrally with the cover 20 is fit-engaged with the hole 10a of the case 10.

As shown in FIG. 5C, according to Embodiment 1, when each rib 20a of the cover 20 is fit-engaged with the corresponding hole 10a of the first case 10, the second portion of the rib 20a is caught by the hole 10a, whereby an outwardly expanding force of the peripheral edge portion 20b of the cover 20 is suppressed through the first portions of the ribs 20a formed integrally with the cover 20. As a result, it is possible to prevent outward expansion of the peripheral edge portion 20b of the cover 20. Further, even if the upper portion of the cover 20 (the portion near the center of the outer surface) is pushed after assembly, it is possible to prevent opening of the peripheral edge portion 20b of the cover 20, so that it is possible to maintain a satisfactory outward appearance. Further, the ribs 20a, the first portions of which can forcibly suppress opening of the peripheral edge portion 20b of the cover 20, need not be provided over the entire periphery of the cover 20. Thus, there is no need to add any extra structural body to the first case 10, thus making it possible to secure the requisite mounting place for the built-in components.

Embodiment 2

Figure 6:
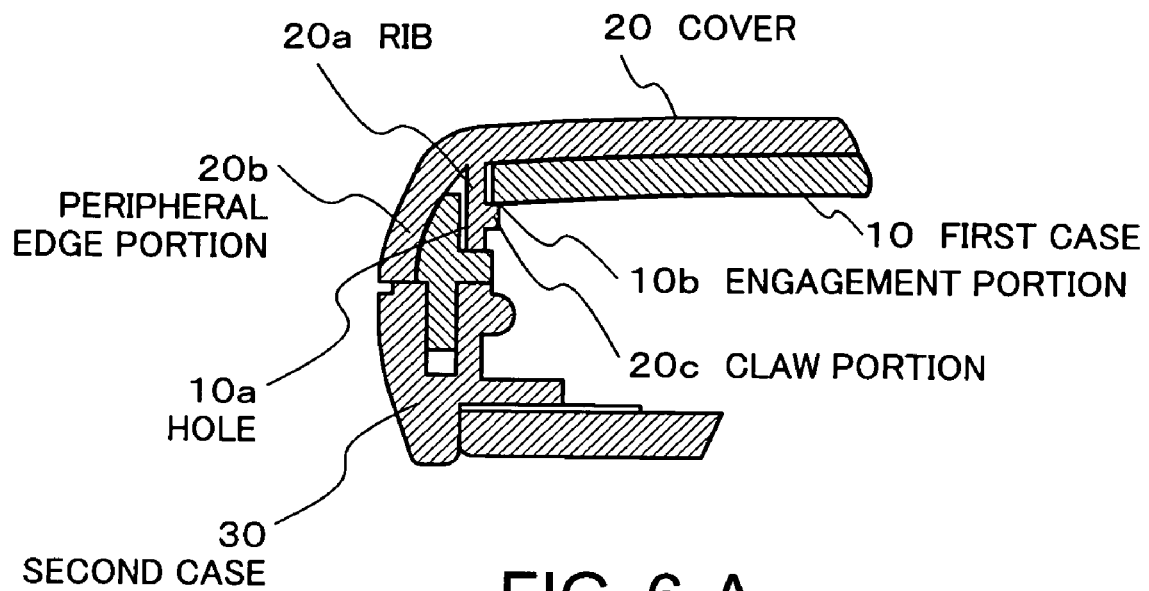
FIG. 6A is a partial sectional view schematically showing the construction of an electronic apparatus according to Embodiment 2 of the present invention.
FIG. 6B is a partial perspective view schematically showing an example of the construction of a rib according to Embodiment 2 of the present invention.
Figure 6:
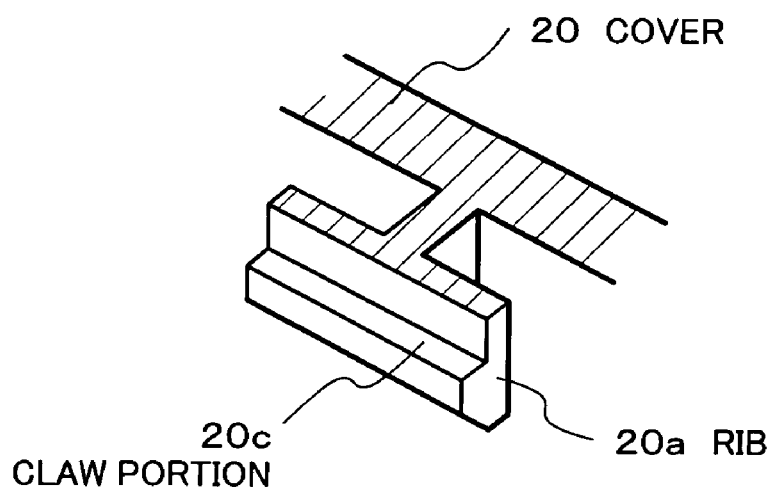
Figure 7:
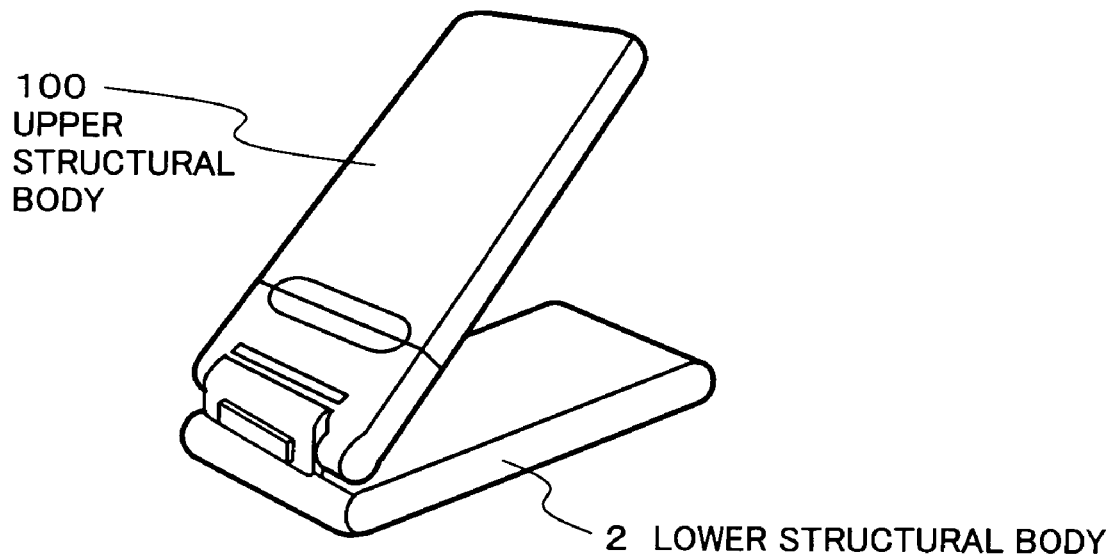
FIG. 7A is an outward perspective view schematically showing the construction of an example of a conventional electronic apparatus.
FIG. 7B is a side view schematically showing the construction of an upper structural body in FIG. 7A.
Figure 7:
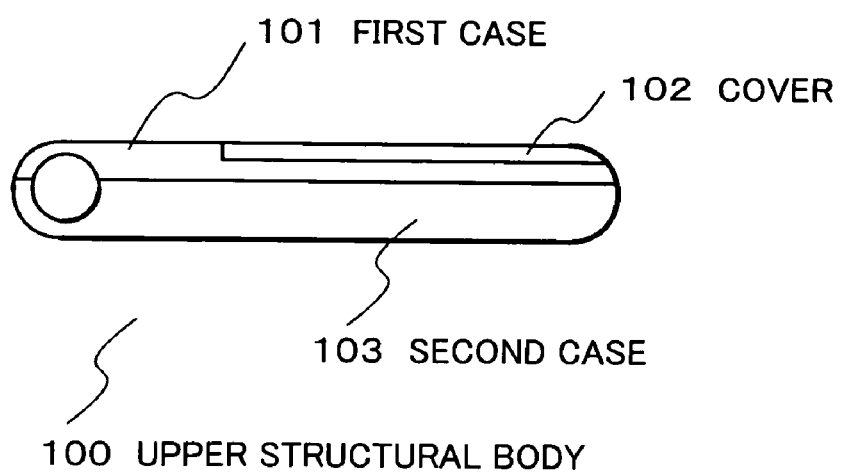
Figure 8:
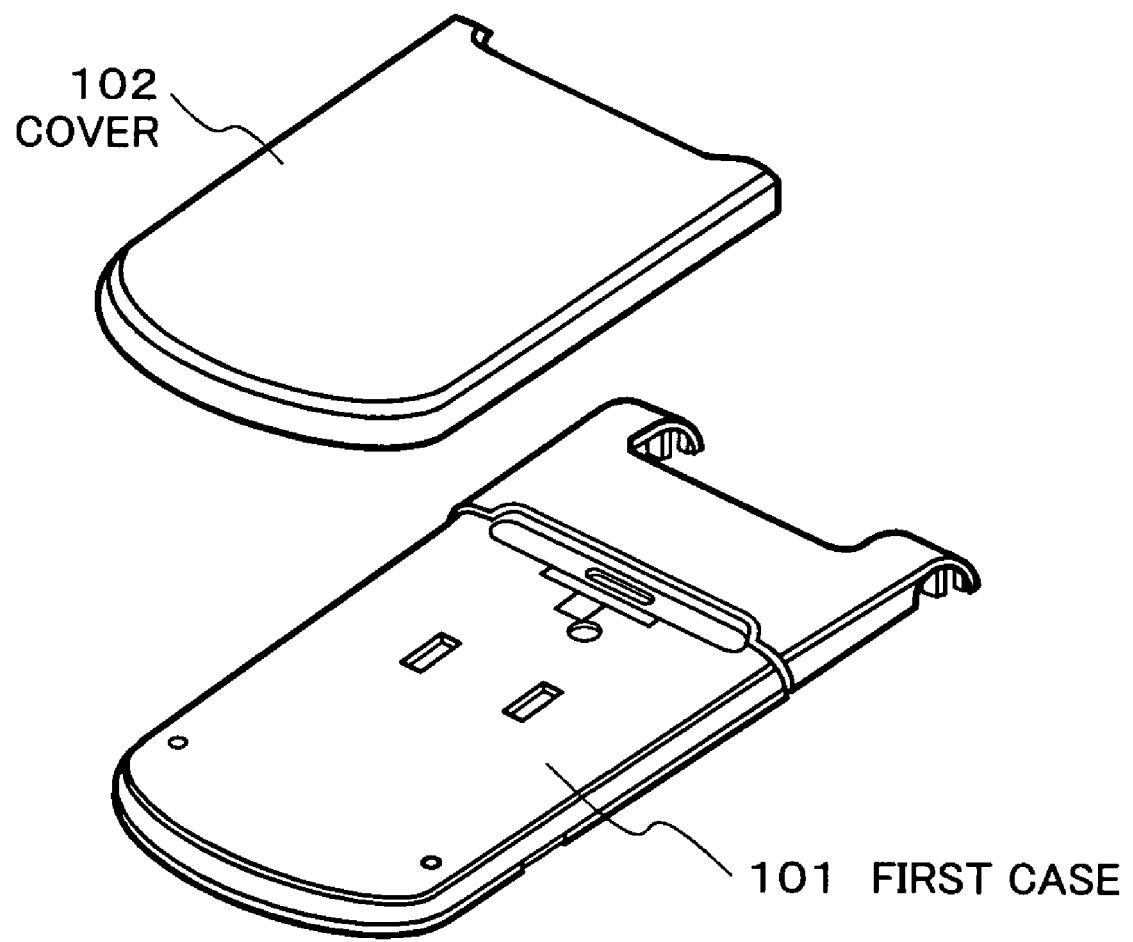
FIG. 8 is an exploded perspective view schematically showing the construction of a cover and a case of an electronic apparatus according to Conventional Example 1.
Figure 9:
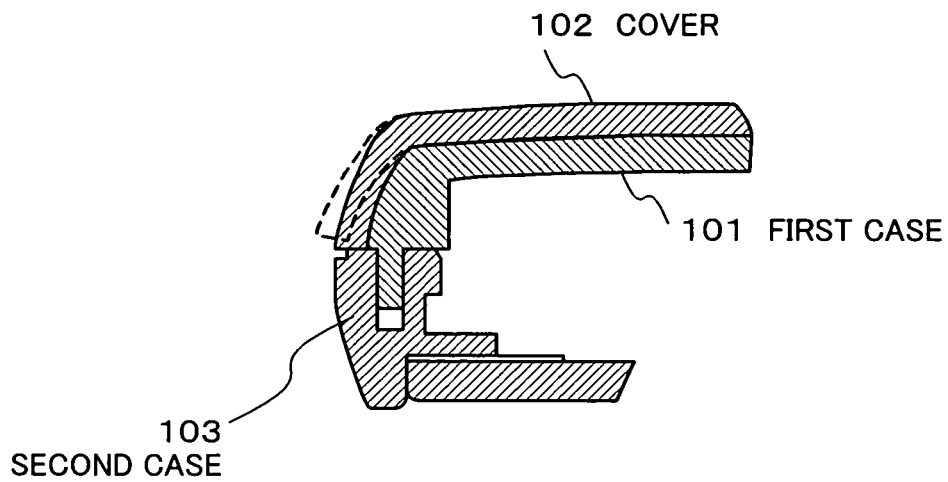
FIG. 9 is a partial sectional view schematically showing the construction of the electronic apparatus according to Conventional Example 1.
Figure 10:
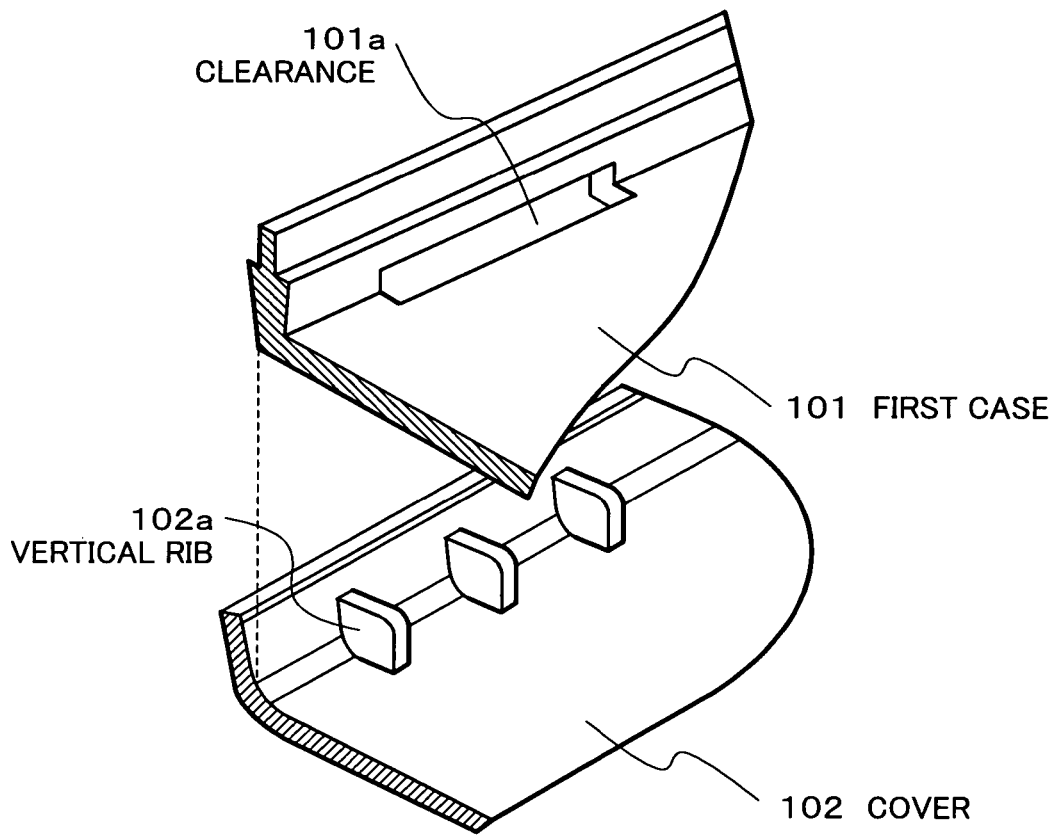
FIG. 10 is a partial exploded perspective view schematically showing the construction of an electronic apparatus according to Conventional Example 2.
Figure 11:
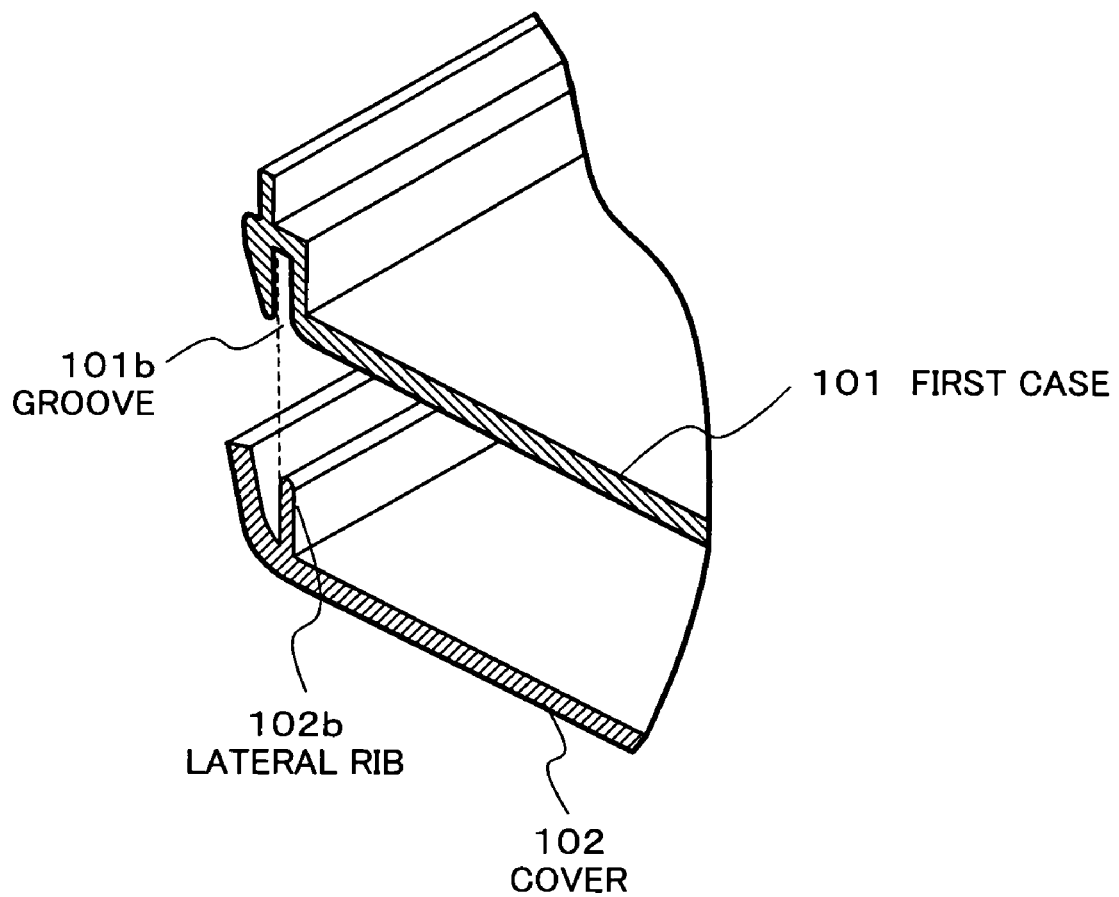
FIG. 11 is a partial exploded perspective view schematically showing the construction of an electronic apparatus according to Conventional Example 3.

Next, Embodiment 2 of the present invention will be described with reference to the drawings. FIG. 6A is a partial sectional view schematically showing the construction of an electronic apparatus according to Embodiment 2 of the present invention. FIG. 6B is a partial perspective view schematically showing an example of the construction of a rib 20a according to Embodiment 2 of the present invention.

In an electronic apparatus according to Embodiment 2, a claw portion 20c is provided in the vicinity of the distal end of each rib 20a provided on the cover 20 and, at a position of the first case 10 corresponding to each claw portion 20c, there is provided an engagement portion 10b to be engaged with the claw portion 20c. Otherwise, this embodiment is of the same construction as Embodiment 1. According to Embodiment 2, the claw portions 20c of the ribs 20a are engaged with the engagement portions 10b of the first case 10, whereby it is possible to fix the cover 20 and the first case 10 to each other at the peripheral edge portion (in the vicinity of the outer periphery) of the cover 20. Thus, it is possible to minimize upward rise (i.e., rise away from the first case 10) of the cover 20. Further, when applied to an electronic apparatus requiring detachment of the cover 20 (e.g., an electronic apparatus capable of cover change), this embodiment can realize a cover lock mechanism with a small space while rectifying curvature of the cover 20.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. Therefore, the present invention is not intended to be limited to the embodiments described herein but is to be accorded the widest scope as defined by the limitations of the claims and equivalents.

Further, it is noted that the inventor's intent is to refrain all equivalents of the claimed invention even if the claims are amended during prosecution.

What is claimed is:

1. An telephone apparatus having a cover attached to an outside of a structural body of said telephone apparatus, wherein at least a peripheral edge portion of said cover is continuously curved inwards along a side end portion of said structural body, wherein said telephone apparatus comprising:

said cover provided with a plurality of ribs protruding at predetermined curved portions on an inner side of said cover, each rib is an integral unit having a first portion and a second portion each including a linear component wherein said linear component of said first portion is provided so as to cross a crease of said curved portion along an orthogonal direction and said linear component of said second portion is provided so as to cross said first portion along an orthogonal direction; and said structural body provided with a plurality of holes at a side end corner portion of said structural body, and each hole has the same shape as said rib and each located at a position corresponding to each of said plurality of ribs for fit-engaging with said rib.

2. An telephone apparatus according to claim 1, wherein at least one of said ribs is a T-shaped integral unit, wherein a vertical portion of said T-shaped integral unit is provided so as to cross the crease of said curved portion with the orthogonal direction, and wherein said hole is a T-shaped hole.

3. The telephone apparatus according to claim 2, wherein said rib has a claw portion at a horizontal portion of said T-shaped integral unit, and said structural body has an engagement portion at a position corresponding to said claw portion of said rib.

4. An telephone apparatus according to claim 1, wherein each rib has a claw portion at said linear component of said second portion, and the structural body has, at a position corresponding to each claw portion, an engagement portion to be engaged with the claw portion, and wherein the claw portion protrudes out from said second portion along the orthogonal direction that the first portion protrudes from the peripheral edge portion.

5. The telephone apparatus according to claim 1, wherein at least one of said ribs is a L-shaped integral unit, wherein a vertical portion of said L-shaped integral unit is provided so as to cross the crease of said curved portion along the orthogonal direction, and wherein said hole is a L-shaped hole.

6. The telephone apparatus according to claim 5, wherein said rib has a claw portion at a horizontal portion of said L-shaped integral unit, and said structural body has an engagement portion at a position corresponding to said claw portion of said rib.

* * * * *